Figure 1:
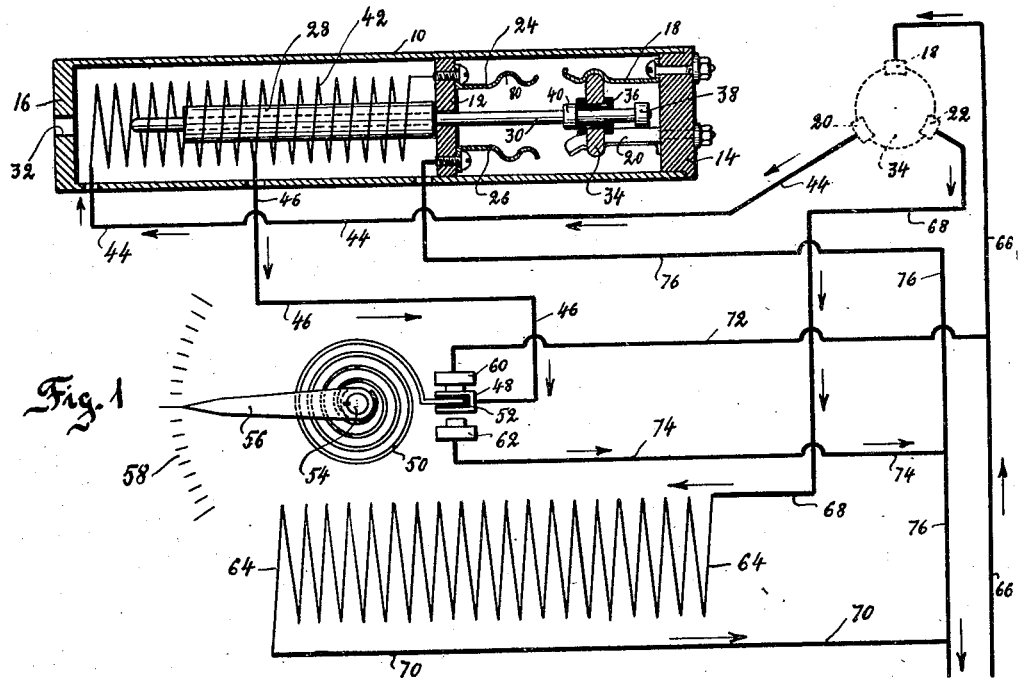

Oct. 20, 1931.  B. J. YANCHENKO  1,827,831

TEMPERATURE CONTROLLING DEVICE

Filed July 30, 1926

INVENTOR
Basil J. Yanchenko
BY
his ATTORNEYS

Patented Oct. 20, 1931

1,827,831

UNITED STATES PATENT OFFICE

BASIL J. YANCHENKO, OF NEW YORK, N. Y., ASSIGNOR TO JAMES CAMROD LEDBETTER, OF NEW YORK, N. Y.

TEMPERATURE CONTROLLING DEVICE

Application filed July 30, 1926. Serial No. 125,878.

This invention pertains to electric temperature controllers and more particularly to circuit controllers operable by automatic contact means.

Such devices are used for regulating the temperature of electrically heated apparatus of all kinds, such, for instance, as furnaces, sad irons, presses, heaters, and other apparatus of similar nature.

Electric heating devices always draw a heavy current and it has been a difficult problem to control that current to regulate the heat produced by it. If the flow of current is governed by resistances in the circuit, there is great waste of power in those resistances. If the temperature be controlled by making and breaking the heating circuit great difficulty is encountered on account of the arcing that occurs when the heavy heating circuit is broken.

In such an arrangement, the making and breaking of the circuit is usually controlled by a thermostatic device which controls the making and breaking of the heating circuit either directly or through the making and breaking of a secondary circuit. In either case, any arcing at the thermostatically controlled contact points soon burns those points and seriously impairs the accuracy of their operation.

Another difficulty which has been encountered in previous devices is the control of the control device itself so that the sensitiveness of the device may be changed, and so that the temperature maintained by the device may be altered at the will of the operator.

By sensitiveness is meant the change of temperature required to cause the device to make or break the heating circuit. For instance, for one purpose, a temperature range of fifty degrees might be satisfactory, whereas for another purpose a range of one degree might be required. The one-degree control is said to be more sensitive than the fifty-degree control.

The other kind of regulation required is the control of the temperature itself, independently of the sensitiveness of control. For instance, a certain heating device, for one purpose, may be required to maintain a temperature of one hundred degrees and that same heater, for some other purpose, may be required to maintain a temperature of five hundred degrees.

The principal object of my invention is to overcome the above problems.

An object of the invention is to entirely obviate sparking at the thermostatically controlled contacts, or at the contacts otherwise actuated and controlled.

Another object is to break the heating circuit quickly.

Another object is to so design the make and break device of the heating circuit that no damage will be done by the sparking that occurs between its contact surfaces.

Another object is to completely enclose the make and break device of the heating circuit.

Another object is to provide means by which the operator may easily control the temperature maintained by the device.

Another object is to provide a device that will work with either direct or alternating current.

Another object is to so design the device that its sensitiveness may readily be changed.

Another object is to provide a device which is simple, rugged, compact, easy to repair and cheap to manufacture.

Further and other objects and advantages will be hereinafter set forth in the accompanying specification and claims, and shown in the drawings, which by way of illustration show what is now considered to be the preferred embodiment of the invention.

Fig. 1 is a view of the entire device, showing a cross section of the heating circuit make and break device, together with a diagrammatic layout of the thermostatic control device and electric circuits. For clarity of description, the wiring connections to the "Three finger" portion of the make and break device is shown dotted. This view shows the circuits while heating.

Figure 2:
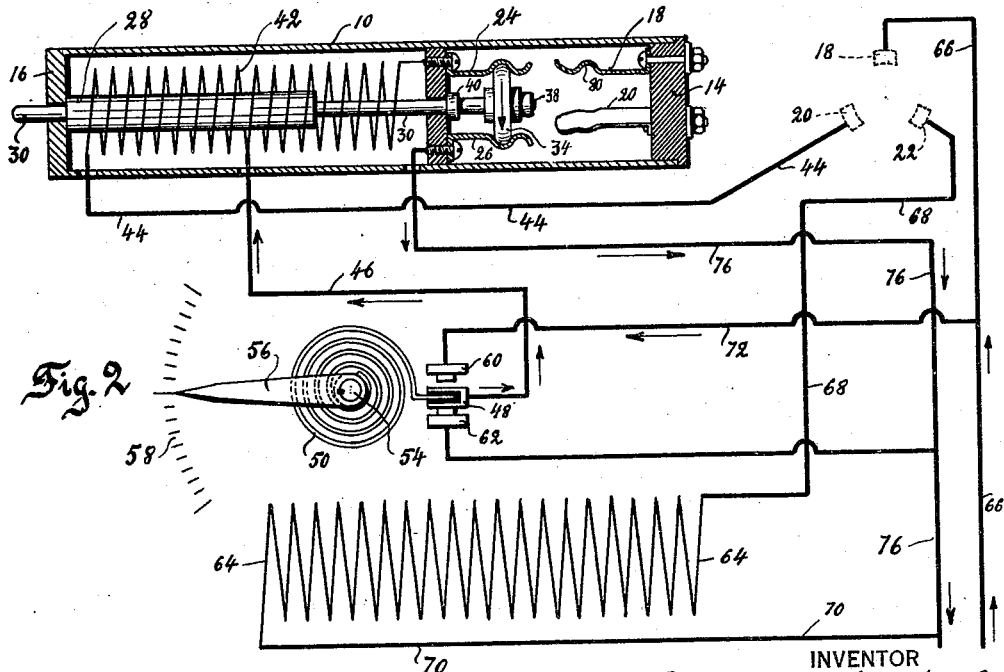

Fig. 2 is the same as Fig. 1 except that the heating circuit is open.

In the drawings 10 is a tubular casing provided with a partition 12, a head 14 and a head 16. Projecting inwardly from head 14 are three equally spaced contact fingers 18, 20 and 22 within a switch-means chamber formed between the partition 12 and head 14.

Secured to partition 12 and projecting towards head 14 are two diametrically opposite contact fingers 24 and 26. Positioned axially in the magnetic-means chamber formed between partition 12 and head 16 is the solenoid plunger 28, provided with a stem 30, one end of which may pass through an indicating hole 32 in the center of head 16, and the other end of which passes through a slide-bearing hole in the center of partition 12 into the switch-means chamber between partition 12 and head 14. On the end of rod 30 adjacent head 14 is slidably mounted a contact or switch blade disc 34, provided with non-conducting hub 36 which insulates the switch blade disc 34 from shaft 30. The free longitudinal movement of disc 34 on rod 30 is limited by collars 38 and 40, fast on rod 30.

Surrounding solenoid plunger 28 is the solenoid coil 42. One end of coil 42 is connected by wire 44 to finger 20. The other end of coil 42 is connected to finger 24, and the middle point of coil 42 is connected by wire 46 to contact block 48, which is fast to the free end of the thermostatic control member 50. Block 48 is insulated from member 50 by insulating block 52.

For convenience, the thermostatic control member 50 is shown as a bimetallic coil, fast at its center to stud 54, and so arranged that heating of coil 50 will tend to contract the coil and move contact block 48 downwardly.

Fast on stud 54 is an arm 56 manually settable with reference to graduated scale 58. If arm 56 is moved towards the lower end of the scale it is evident that coil 50 will become more tightly wound and will press contact block 48 more firmly upwards against terminal 60. This means that a higher temperature will have to be attained before coil 50 will be contracted sufficiently to cause block 48 to leave terminal 60 and contact with lower terminal 62. On the other hand, if arm 56 be moved upwardly, a lower temperature will cause the above movement.

The heating coil is designated 64, and the consumption of current thereby is regulated by my improved temperature controller, the thermostat 50 of which is placed in proximity to the electric heater 64.

With the above description in mind, the action of the device will be readily understood. In Fig. 1 current flows from source (not shown) through wire 66, finger 18, switch disc 34, contact finger 22, wire 68, coil 64, wire 70 back to source. It will be noticed that a circuit is closed from finger 18 through disc 34, contact finger 20, wire 44, solenoid 42, wire 46, block 48, terminal 60 and wire 72 but as it leads back to the wire 66, to which finger 18 is connected, no current flows through the solenoid.

However, when the temperature rises sufficiently to move block 48 out of contact with 60 and into contact with 62, current flows as follows,—wire 66, finger 18, switch disc 34, contact finger 20, wire 44, left half of solenoid 42, wire 46, block 48, terminal 62, and wire 74 back to source through wire 76.

This energizes solenoid coil 42 and draws plunger 28 and rod 30 to the left. Rod 30 is well under way before collar 38 encounters hub 36 of disc 34. Therefore, disc 34 is moved suddenly, as by a hammer blow, out of contact with fingers 18, 20 and 22, into contact with fingers 24 and 26, and the parts are then in the position shown in Fig. 2, in which no current can flow to heater coil 64 because disc 34 having been removed, there is no connection between fingers 18 and 22 and consequently no current can flow from wire 66 to wire 68. Neither is any current flowing through solenoid coil 42, because there is no connection between fingers 18 and 20, consequently no current can reach wire 44 from supply wire 66. When current is supplied as described above, to solenoid coil 42 the action of the solenoid on disc 34 is so rapid as to be almost instantaneous. This action permits the device to function equally as well with alternating as with direct current. If alternating current be used, disc 34 is moved so rapidly that the operation is completed before the change in current cycle occurs.

When the temperature of the current consuming apparatus 64 has fallen sufficiently for contact block 48 to move out of contact with terminal 62 and into contact with terminal 60, a circuit is established as follows,—wire 66, wire 72, terminal 60, wire 46, right half of solenoid coil 42, finger 24, disc 34, finger 26, and wire 76 to source. This energizes the right half of magnetic coil 42 and moves solenoid plunger 28 to the right, moving disc 34 instantly, as before, out of contact with fingers 24 and 26 and into contact with fingers 18, 20 and 22, or, in other words, back to the position shown in Fig. 1, and current again flows through heater coil 64.

In actual practice the clearance between the thermostatic contact block 48 and terminals 60 and 62 is so slight as to be almost imperceptible, and movement of the thermostat 50 is therefore short and consequently the variation in temperature to effect this short movement is slight.

When the parts are in the position shown in Fig. 1, the solenoid plunger 28 and rod 30 are held centrally in cylinder 10 by the three fingers 18, 20, 22 and by partition 12. When the parts are as shown in Fig. 2 the solenoid is located by the holes in head 16 and partition 12.

The projection of stem 30 through head 16, as in Fig. 2, serves to indicate to the operator that the heating circuit to heater 64 is broken. Partition 12 and head 14 are of non-conducting material in order to insulate the contact fingers.

The sensitiveness of the device depends largely on the length of coil 50 and the thickness of the metals composing it. If it be desired to change the sensitiveness of control of the device, it is only necessary to remove the coil 50 and replace it with another coil which will give the desired result.

If it is desired to change the temperature maintained by the device, it is only necessary, as already explained, to move arm 56 relatively to dial 58.

It will be noticed that fingers 18, 20, 22, 24 and 26 are all shaped as at 80 to fit partly around the rim of disc 34. This is done to prevent the displacement of disc 34 due to vibration, accidental jars, etc.

It will be noticed that there is never any circuit broken by thermostatically controlled contact block 48, hence, there is no arcing at that point. The only breaking of circuits occurs between disc 34 and the contact fingers, and if arcing occurs there no harm is done because there is no delicate adjustment involved, as is the case at block 48.

There is no appreciable heating of tube 10 and its controls because the current flow through the solenoid coil is only momentary, and is never maintained for any length of time.

It will be understood that the thermostat 50 must be located in the device at the place where the control of temperature is desired and usually proximate the heater 64.

Casing 10 may be of any material but is preferably made of iron because the use of an iron shield in close proximity to the solenoid greatly increases the strength and efficiency thereof.

It is now understood that I have produced a circuit controller to stop and start the flow of current to a current consuming apparatus, wherein the controller does not itself draw current before or after its operation. In other words the controller only draws current during that fraction of a second in which the current is being either stopped or started through the main circuit leading to a heater or other current consuming apparatus.

The example of circuit controller shown is provided with one set of contacts which includes the three fingers 18, 20 and 22 which three member contact set is spaced from a two member contact set 24 and 26. The movable switch blade 34 jumps the space between the two sets of contacts and engages one set or the other but does not remain idle therebetween.

When the switch member or blade 34 closes across the contact means 18—20—22, the main circuit 66—76 feeds current to the apparatus, but no current passes through the magnetic means 42 of the controller apparatus. Likewise when the switch member 34 jumps across to close the circuit between the contact means 24—26, the current flow in main circuit 66—76 is stopped, but again no current passes through the magnetic apparatus 42 of the controller.

On the other hand, when the automatic contact 48 moves for any cause, as by the contraction or expansion of the bimetallic member 50, from 62 to 60, it follows that the magnetic means 42 is energized, in one of its ends, during the split second of time only in which the switch blade 34 remains in engagement with the contact means 24—26, for indeed the breaking of the switch 34 from contacts 24—26 acts to deenergize that end of the magnet 42 which initially causes displacement of the switch 34, but the switch 34 having already been reset to its new position, the instantaneous de-energization of the magnetic means does not interfere with the normal operation of the controller.

The mode of operation described in the foregoing paragraph is just as true and is similarly executed when the automatic contact 48 moves from 60 back to 62 for then the other end of the magnet is energized to drive the plunger back and jump the disc blade into its new position, the action of which again instantaneously de-energizes the magnet but does so too late to avoid the new switch setting action.

The foregoing novelty is carried out by my new construction. I use for example a three point contact 18—20—22 at one end of the switch blade jump and a two point contact 24—26 at the other end thereof, and both contact means are in one end or chamber of the case 10, while the magnet 42 is in the other end of the case. The main circuit 66—76 is connected to two points and one end of the magnet to the other point of the three point contacts 18—20—22, while the other end of the magnet is connected at one point and the automatically actuated contact 48 to the other point of said two point contact means 24—26.

I use one-half of the magnet 42 at a time and switch from a three point contact means to a two point contact means. In this way I simplify the construction of circuit controllers and do not heat the magnets thereof and also avoid the presence of current at the contact means 48—60—62 when separation of the latter transpires but allow the passage of current when closure occurs, and thus no arcing is drawn or occurs and the life of the latter named contact is long.

It is to be understood that the invention is not limited to the specific construction herein illustrated and described but can be embodied in other forms without departure from its spirit.

Claims:

1. A device of the class described comprising in combination, a heating circuit including a circuit breaking device, a control apparatus being connected to the heating circuit and including a circuit making device, means actuated by said control apparatus to operate said circuit breaking device upon the closing of said circuit making device; said control apparatus comprising a tubular casing, a solenoid coil therein, a plunger actuated within and by the solenoid, a switch means carried on the plunger, a set of contact fingers fixed within the casing on one side of the switch means, a set of contact fingers fixed in the casing on the other side of the switch means, and connections between the contact fingers and heating circuit and the circuit breaking device.

2. A temperature controller comprising in combination, a heating coil, a circuit breaker in circuit with said heating coil, a thermostatic apparatus including a circuit making device, means controlled by said thermostatic apparatus for operating said circuit breaker when said circuit making device is closed; said circuit breaker comprising two sets of contact fingers fixed in spaced relation, a switch means movably disposed between the two sets of contact fingers, solenoid means and a plunger actuated thereby, said switch means being movably carried on the plunger, means to limit the movement of the plunger in relation to the switch means so the former first attains rapid motion to suddenly move the latter out of engagement with one set of contact fingers into engagement with the other set of contact fingers; and electrical connections made between the contact fingers and heating coil and thermostatic apparatus.

3. A circuit controller comprising, a heating circuit, a magnet and magnetically controlled circuit breaker connected with said circuit, a thermostatic apparatus including a circuit making device, and means to energize said magnet and operate said circuit breaker when said circuit making device is closed, said circuit breaker comprising a switch blade, a plurality of contact fingers in contact with said switch blade, and a hammer like device operable when said magnet is energized to drive said switch blade out of contact with said contact fingers.

4. A circuit controller comprising, current consuming apparatus and a main circuit connected therewith; a three point contact, two points of which are connected with the main circuit; a magnet, one end of which is connected to the third point of the three point contact, and the other end of which is adapted to be connected to one side of the main circuit; a contact in combination with means to automatically move the same, and an electrical connection made between the movable contact and the central region of the magnet; spaced normally stationary contacts placed to either side of the automatically moved contact and against which, one or the other, the automatically moved contact is adapted to rest; and electrical connections established between the stationary contacts and main circuit.

5. A circuit controller comprising; a tubular case, closed at each end by a head, and partitioned centrally, to form a magnet chamber, and a contact chamber, a magnetic means disposed in the magnet chamber, and spaced sets of contact means in the contact chamber, one set of which is adapted to be connected with a main circuit leading to a current consuming apparatus; a switch blade, and means operated by the magnetic means to drive the switch blade back and forth between the spaced contacts; a controller contact means including three contacts, one of which is movable automatically and is connected with the magnetic means, and the other two of which are adapted to be connected with the main circuit.

6. A circuit controller comprising; a two point set of contact means, a three point set of contact means spaced therefrom and adapted to be connected with a main circuit to be controlled, and a switch member movable in the space between the contact means to close first one set and then the other; a magnet and means actuated thereby to move the switch member from one contact means to the other, and a thermostatic control contact means connected with the central region of the magnet and adapted to be connected with a main circuit to be controlled.

7. In a temperature controller, a main feed circuit adapted to be connected with an electrical heating apparatus, a set of three contacts two of which are in series with said main feed circuit, a magnet connected with the third contact, a set of two contacts spaced from the set of three contacts, a switch adapted to oscillate between the two sets of contacts and an operating connection from the magnet to the switch, one contact of the set of two being connected to the magnet and the other contact thereof being connected to the main feed circuit, a thermostat sensitive to temperature variation and having a contact movable therewith, an electrical connection from the movable contact to the magnet, spaced contact points on each side of and between which the movable contact works, and electrical connections from the last two named contacts to the main feed circuit.

8. A temperature controller for electrical circuits comprising a heating circuit and a heating coil therein, a normally de-energized magnet means and magnetically controlled circuit breaker connected with said heating circuit, said magnet means including two separate windings formed on the same axis and connected at their adjacent ends, one winding closing and the other winding opening the circuit breaker, a thermostatic apparatus including a circuit making device which is connected to the adjacent ends of the two windings, whereby an electric current energizes said magnet windings and operates said circuit breaker when said circuit making device is closed, and circuit means to de-energize said magnet windings after said circuit making device is closed.

9. The invention set forth in claim 8 in which means is also provided to de-energize said magnet means when said circuit breaker opens whereby said magnet means is normally de-energized and hense does not draw current other than during the instant of closing or opening of the circuit breaker.

10. A device of the class described comprising in combination, a heating circuit including a circuit breaker connected therein and having two operative positions, said circuit breaker including two magnets in which one magnet pulls the circuit breaker to one operative position and the other magnet pulls the circuit breaker to the other operative position, a control circuit including a circuit maker having two operative positions, said circuit maker including a thermostatic apparatus controlling and having a movable contact permanently connected with both magnets and said control circuit including means interconnecting said circuit maker and said circuit breaker so that whenever said circuit maker assumes one of its operative positions said circuit breaker will change from one to the other of its operative positions, two fixed contacts between which the movable contact works, and an electrical connection directly from each fixed contact to the heating circuit.

11. A circuit controller comprising, a heating circuit, a compound magnet comprising two windings and a magnetically controlled circuit breaker connected with said heating circuit, a thermostatic apparatus including a circuit making device having a movable contact connected with one end of each magnet, means to energize said magnet windings and operate said circuit breaker when said circuit making device is closed, said circuit breaker comprising a switch blade and a plurality of contact fingers in movable contact therewith, whereby said magnet is de-energized after the switch blade disengages the fingers, a pair of sets of spaced contacts between which the movable contacts works, and an electrical connection from each spaced contact to the heating circuit.

12. A circuit controlling means comprising a tubular casing, a partition in the casing which divides the casing into a magnetic-means chamber and a switch-means chamber, said partition being provided with a slide-bearing hole therein, a plunger means slidably confined in the slide-bearing hole and projecting into both chambers, magnetic means in one chamber to reciprocate the plunger, switch means in the other chamber operatively connected with the plunger, an electric current feed circuit connected with the switch and adapted to be opened and closed thereby, a control circuit connected with the magnetic means, and thermostatic means operatively connected with the control circuit to make and break the latter.

13. A circuit controlling means comprising a tubular casing, a partition in the casing which divides the casing into a magnetic-means chamber and a switch-means chamber, said partition being provided with a slide-bearing hole therein, a plunger means slidably confined in the slide-bearing hole and projecting into both chambers, magnetic means in one chamber to reciprocate the plunger, a switch blade disc mounted within the switch-means chamber and the plunger slidably disposed through said disc, insulating means disposed between the switch blade disc and the plunger, collar means fixed to the plunger means on each side of the disc and spaced from the disc so the plunger may move in relation to the disc, two sets of spaced contact means in the switch-means chamber between which the disc reciprocates, a feed circuit connected to one set of contact means, a connection between the other contact means and the magnetic means, a control circuit connected to the magnetic means, and a circuit making device sensitive to temperature changes included in the control circuit to energize the magnetic means.

14. A circuit controlling means as defined in claim 13 in which the switch disc is jumped from one set of contact means to the other and remains in positive engagement with one set of contact means irrespective of whether the feed circuit is opened or closed.

15. A temperature controlling device comprising a thermostatic member adapted to flex in response to temperature variations, a movable contact carried on and insulated from the thermostatic member and movable with said flexing thermostatic member, closely spaced stationary terminals between which the movable contact operates, said movable contact adapted to positively engage one or the other stationary terminals, a feed circuit, an electrical connection from each stationary terminal to each side of the feed circuit, switch means and electrical connections therefrom to the feed circuit, said switch means including two spaced sets of contact means between which a switch blade is adapted to jump from one set of contact means to the other and make positive engagement with one or the other contact means, magnetic power means operatively connected with the switch means to operate the switch blade across the space from one contact means to the other, electrical connections from the magnetic power means to the switch means, an electrical connection from the movable contact to the magnetic power means, the switch blade remaining in engagement with one or the other set of contact means, and the movable contact likewise remaining in engagement with the stationary terminals irrespective of whether the feed circuit is open or closed.

In testimony whereof I hereto affix my signature.

BASIL J. YANCHENKO.